3,365,495
2,4-DI-T-ALKYL-1,3,2,4-DITHIADIAZETIDINES
David H. Clemens, Willow Grove, Pa., assignor to
Rohm & Haas Company, Philadelphia, Pa., a corporation of Delaware
No Drawing. Filed Sept. 9, 1964, Ser. No. 395,281
8 Claims. (Cl. 260—563)

ABSTRACT OF THE DISCLOSURE 1,3,2,4-dithiadiazetidines having tertiary-alkyl groups on the two heterocyclic nitrogen atoms are produced by reacting tertiary-alkyl amines with sulfur dichloride. These dithiadiazetidines are notably stable.

---

This invention is concerned with new 2,4-di-t-alkyl-1,3,2,4-dithiadiazetidines of the structure

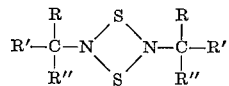

wherein R, R' and R'' represent alkyl groups and a method for preparing them.

These compounds are prepared by reacting tertiary-alkylamines with sulfur dichloride, $SCl_2$.

By this invention, there are made available novel dialkyl-1,3,2,4-dithiadiazetidines which are easily prepared from readily available raw materials and which are notably stable by comparison with previously known related structures. They are particularly useful as fungicides, as corrosion inhibitors and as chemical intermediates, particularly for the preparation of N,N'-di-ti-alkyl sulfurdiimines.

The reaction of certain primary amines with sulfur dichloride has been the subject of previous studies. However, the products resulting from such reactions have been mixtures of ill-defined, unstable polymers. As early as 1895, Lengfeld and Stieglitz in Ber. Deut. Chem. 28, 2742 found that the reaction of ethylamine with sulfur dichloride gave an unstable red liquid. Badertscher and Altamura, see United States Patent No. 2,218,447, studied the reaction of monobutylamine and monocyclohexylamine with sulfur dichloride and found the tetrameric products to be unstable and the reactions hazardous. Stone and Nielsen, in JACS 81, 3580 (1959) report that the reaction of methylamine with sulfur dichloride gave chiefly an unstable polymer. It was, therefore, surprising to find that when t-alkylamines are reacted with sulfur dichloride, well-defined, relatively stable and storeable primary products are obtained.

The reaction proper involves two moles of the t-alkylamine with one mole of sulfur dichloride, $SCl_2$. However, since hydrogen chloride is split out, it is desirable to have an acid acceptor present. This is most effectively done by using an excess of the t-alkylamine, e.g.,

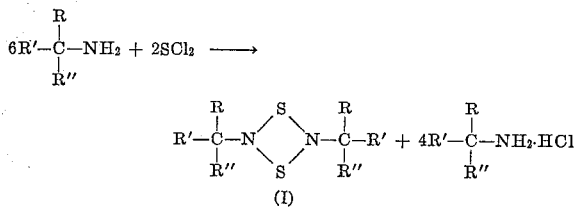

Excesses of the t-alkylamine up to twice the number of moles shown in the above equations or more may be used. In some cases, however, other alkaline agents may be employed. Examples of this are tertiary-amines, such as triethylamine or pyridine, alkali metal hydroxides, such as sodium or potassium hydroxides and inorganic carbonates, such as calcium carbonate. These acid acceptors may be in an anhydrous state or as aqueous solutions.

t-Alkylamines which may be used in these reactions include, for example, t-butylamine, t-octylamine, t-nonylamine, t-dodecylamine, t-tetradecylamine, t-octadecylamine, t-docosylamine, t-tetracosylamine and mixtures of two or more of such amines. These amines are commonly prepared by the so-called Ritter reaction involving the reaction of nitriles with alkenes or tertiary alcohols in strongly acidic media. Commercially available t-alkyl-amines are often mixtures. t-Octylamine has the structure

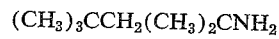

and the alkyl group of this amine will herein be referred to as t-octyl. One form of t-nonylamine is prepared as a mixture containing

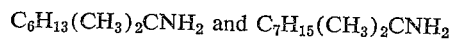

and has a neutral equivalent of about 142. A commercial preparation known by the trademarked name of Primene 81–R is a mixture of t-dodecyl-, t-tridecyl- and t-tetradecylamines having a neutral equivalent of about 191. A commercial preparation known by the trademarked name of Primene JM–T is principally a mixture of

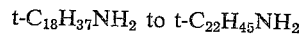

and has a neutral equivalent of about 315. The important consideration is that in a t-alkylamine, the $NH_2$ group is always attached to a carbon atom containing no hydrogen. Even though t-alkylamines of higher molecular weight than t-tetracosylamine may be prepared, for the purpose of this invention, those amines are preferred wherein the total number of carbon atoms in the

 group is less than 25. It is preferred that two of the R groups in the

 grouping of the t-alkylamine be methyl groups.

Typical of the new compounds of the invention are the following:

2,4-di-t-butyl-1,3,2,4-dithiadiazetidine,
2,4-di-t-octyl-1,3,2,4-dithiadiazetidine,
2,4-di-t-nonyl-1,3,2,4-dithiadiazetidine,
2,4-di-t-dodecyl-1,3,2,4-dithiadiazetidine,
2,4-di-t-tetradecyl-1,3,2,4-dithiadiazetidine,
2,4-di-t-octadecyl-1,3,2,4-dithiadiazetidine,
2,4-di-t-eicosyl-1,3,2,4-dithiadiazetidine,
2,4-di-t-docosyl-1,3,2,4-dithiadiazetidine and
2,4-di-t-tetracosyl-1,3,2,4-dithiadiazetidine.

Molecular weight determinations on the products of this invention indicate that these products are dimeric. On the basis of the tetrameric and other polymeric products, described in the literature as obtained with primary amines other than t-alkylamines, the formation of dimers in the present invention is entirely unexpected. It may be theorized that these dimeric products are thermodynamically more stable. The dimeric structure depicted by the dithiadiazetidine heterocyclic compounds is one representation of t-alkyl thionitroso compounds of the structure, t-alkylN=S, in the dimeric form. Structures other than this, such as

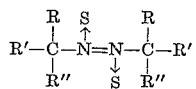

may be visualized. The specific structures should not be construed to limit this invention even though they have been chosen as a convenient method for depicting and naming them.

The reactions may be run in the absence of a solvent or in the presence of a volatile, inert, organic solvent. An excess of the t-alkylamine utilized in a specific reaction may be used as the solvent. Common inert solvents which may be employed include ethers, such as diethyl ether, dipropyl ether, dibutyl ether, ethyleneglycoldimethyl ether, diethyleneglycoldimethyl ether and the like; hydrocarbons, such as benzene, toluene, xylene, hexane, mineral spirits and the like; and chlorinated hydrocarbons, such as methylene dichloride, ethylene dichloride, perchloroethylene, chlorobenzene and the like. Mixtures of solvents may also be used.

Reaction temperatures which may be employed are in the range from $-70°$ to about $100°$ C. The preferred temperature for the reaction is between $0°$ and $25°$ C. As a rule, the reactions are exothermic and cooling is often desirable to keep the temperature in this range. In certain cases, the di-t-alkyldithiadiazetidines of this invention may fragment when subjected to temperatures in excess of $65°$ C.; hence, the upper temperature for the reaction is that which will not cause this fragmentation to occur with the specific preparation involved.

The reactions are usually fast and are essentially complete in a matter of minutes. Longer reaction times up to 24 hours or more are not injurious and may be preferred at low reaction temperatures. The reactions are considered complete when the exotherm is over and essentially the theoretical amount of chloride ion has been produced.

The products may be isolated from the reaction mixture as the technical grade products which are often oils. They are usable as such without further purification. They may, however, be further purified by ordinary means, if desired, taking into acount possible limitations due to thermal instability.

The polymeric structures previously known in the literature made from reaction of primary alkylamines, other than t-alkylamines, such as methylamine and ethylamine, with sulfur dichloride, decompose slowly at room temperature and explosively at higher temperatures to give tarry products. In contrast to these, the products of the present invention show no evidence of decomposition after standing for many months at room temperature and on heating at higher temperatures, they do not explode but decompose smoothly to give well-defined products.

The di-t-alkyl-1,3,2,4-dithiadiazetidines undergo the valuable pyrolysis reaction to produce N,N'-di-t-alkyl sulfurdiimines, as illustrated by the following equation:

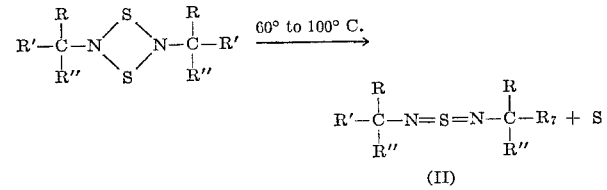

In turn, these N,N'-di-t-alkyl sulfurdiimines are valuable as chemical intermediates and undergo a variety of reactions. For example, the following type reactions have been run to give the indicated type products:

(a) Reaction with isothiocyanates to give carbodiimides (III) which are valuable chemicals and particularly useful in the synthesis of polypeptides, nucleotides and related structures:

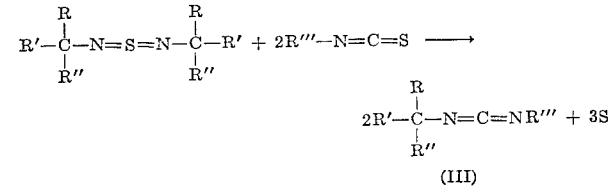

(b) Reaction with isocyanates to produce unsymmetrically substituted sulfurdiimines (IV):

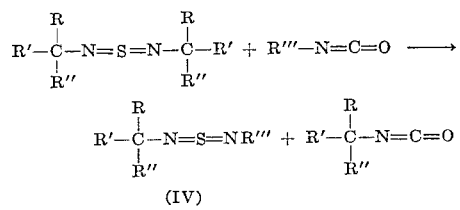

(c) Reaction with hydrogen chloride to give iminosulfur dichlorides (V), a new class of compounds:

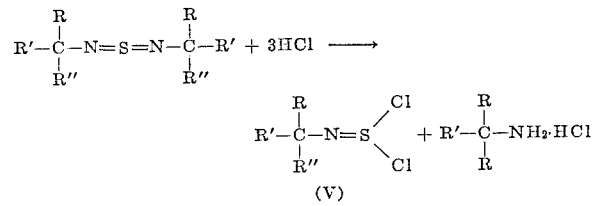

(d) Reaction with aryl aldehydes produces imines (VI) and thionyl amines (VII):

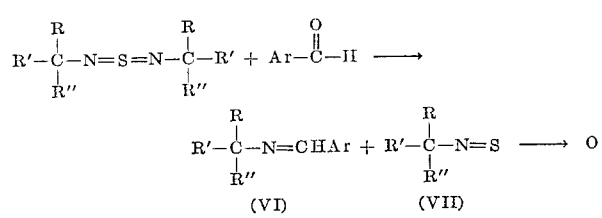

(e) Reaction with thioamides, as illustrated below, for thioacetamide to produce acetonitrile (VIII) and with thiourea to give dicyandiamide (IX):

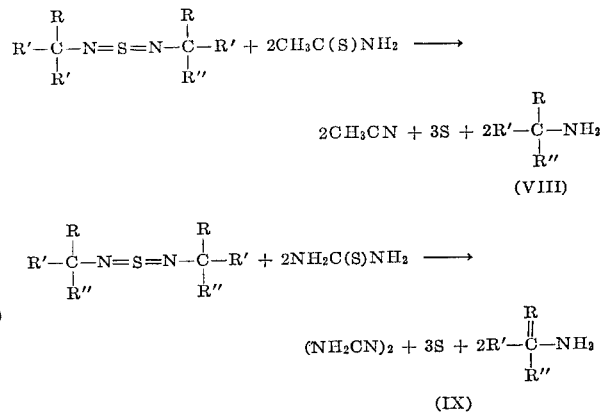

The following examples are provided to further illustrate the invention. They are not to be construed as a limitation thereon. Parts given are by weight.

EXAMPLE 1

Preparation of 2,4-di-t-butyl-1,3,2,4-dithiadiazetidine

A 5-liter 3-neck flask equipped with a condenser, stirrer, drying tube and dropping funnel is charged with a solution of 733 parts (10.0 moles) of t-butylamine in 875 parts of anhydrous ether. This solution is cooled to below $5°$ C. in an ice bath and a solution of 343 parts (3.3 moles) of sulfur dichloride (freshly distilled in the presence of 0.1% PCl$_5$) in 210 parts of anhydrous ether was added dropwise over a period of 4.5 hours with continued cooling at $5°$ to $12°$ C. t-Butylamine hydrochloride precipitates during the addition. The reaction mixture is allowed to stand overnight and is then filtered to remove t-butylamine hydrochloride. This residue is washed with ether and the filtrates are combined. Ether is removed from the combined filtrates by means of a rotating evaporator and after its removal, the evaporation is continued for 2 hours at a pressure of 0.2 mm. of Hg. There is obtained 286 parts of a yellow oil which has a refractive index $n_D^{25}$ of 1.4997 and by nuclear magnetic resonance has a major sharp peak at 8.55 $\tau$ and several minor peaks of approximately equal area at about 8.75 $\tau$.

The oil contains by analysis 46.57% C, 8.94% H, 13.26% N and 31.13% S; calculated values for $C_8H_{18}N_2S_2$ are 46.56% C, 8.79% H, 13.58% N and 31.07% S. This is an 83% yield of a technical grade of 2,4-di-t-butyl-1,3,2,4-dithiadiazetidine.

EXAMPLE 2

*Preparation of 2,4-di-t-octyl-1,3,2,4-dithiadiazetidine*

A solution of 390 parts (3 moles) of t-octylamine in 490 parts of anhydrous ether is placed in a 2-liter 3-neck flask outfitted with a stirrer, thermometer, reflux condenser with a drying tube and a dropping funnel. This is cooled to 5° C. and there is added over a period of 4 hours a solution of 103 parts (1 mole) of sulfur dichloride in 280 parts of anhydrous ether. The reaction mixture is filtered to remove t-octylamine hydrochloride and volatile materials are removed from the filtrate by means of a high vacuum. The residue is filtered to remove a small additional amount of t-octylamine hydrochloride. There remains 134 parts of a yellow oil which has a refractive index $n_D^{25}$ of 1.4835. It contains by analysis 62.46% C, 11.90% H and 9.19% N; calculated values for $$C_{16}H_{34}N_2S_2$$

are 60.32% C, 10.76% H, 8.80% N and a molecular weight of 318.57. The product was found to have a molecular weight of 333 by a vapor pressure lowering method. The oil is a 92% yield of a technical grade of 2,4-di-t-octyl-1,3,2,4-dithiadiazetidine.

EXAMPLE 3

*Preparation of 2,4-di-t-dodecyl-1,3,2,4-dithiadiazetidine*

A solution of 153 parts (0.8 mole) of a commercial grade of a mixture of t-dodecyl-, t-tridecyl- and t-tetradecylamines having a neutral equivalent of 191 in 350 parts of anhydrous ether is placed in a 3-liter 3-neck flask and cooled to 5° C. To this is added dropwise with stirring over a period of 2 hours, a solution of 27 parts (0.2 mole) of sulfur dichloride in 140 parts of anhydrous ether at a temperature range of 5° to 10° C. The reaction mixture is stirred magnetically overnight. It is then washed with aqueous potassium hydroxide using a 20% excess over that needed to neutralize the theoretical amount of hydrogen chloride formed and then three times with water. The ethereal layer is dried over anhydrous sodium sulfate, filtered and then is stripped of the ether in a rotary evaporator leaving a residual oil. This residue is heated up to 110° C. at 1 mm. (Hg) pressure, leaving 74 parts of an amber oil. This product contains by analysis 65.62% C, 11.72% H, 6.52% N and 15.58% S; calculated values for $C_{24}H_{50}N_2S_2$ are 66.90% C, 11.69% H, 6.50% N and 14.88% S and has a molecular weight of 416. The oil is an 84% yield of a technical grade of 2,4-di-t-dodecyl-1,3,2,4-dithiadiazetidine.

EXAMPLE 4

The procedure of Example 3 is followed except that 891 parts of a mixture of 50% t-octadecylamine and 50% t-docosylamine is substituted for the t-dodecylamine. The excess amine is not distilled off and the product is a mixture of 2,4-di-t-octadecyl-1,3,2,4-dithiadiazetidine and 2,4-di-t-docosyl-1,3,2,4-dithiadiazetidine as a solution in a mixture of t-octadecylamine and t-docosylamine.

The compounds of this invention have pesticidal properties and, in particular, are useful in fungicidal compositions. When so used, the compounds are usually taken up in a carrier or are formulated so as to render them suitable for subsequent dissemination as pesticides. For example, the 2,4-di-t-alkyl-1,3,2,4-dithiadiazetidines may be formulated as wettable powders, emulsion concentrates, dusts, granular formulations, aerosols or flowable emulsion concentrates. In such formulations, the compounds are extended with a gaseous liquid or solid carrier and, when desired, suitable surfactants are incorporated.

Liquid compositions containing the compounds of this invention may be made by dissolving or dispersing the compounds in a suitable organic diluent, such as ketones, aliphatic and aromatic hydrocarbons, chlorinated hydrocarbons and pine oil. Suitable solvent-soluble emulsifying and/or dispersing agents may then be added. For example, 25 parts of a 2,4-di-t-alkyl-1,3,2,4-dithiadiazetidine are taken up in 71 parts of xylene and 4 parts of dioctylphenoxypolyethoxyethanol added.

Solid compositions are made by admixing the active ingredients with a finely divided solid commonly used in pesticidal formulations, such as clays, inorganic silicates and carbonates, and silicas and wetting agents, sticking agents and/or dispersing agents may be incorporated. A typical wettable powder may be made by blending 50 parts of a 2,4-di-t-alkyl-1,3,2,4-dithiadiazetidine, 40 parts of hydrated silico aluminate, 5 parts of octylphenoxypolyethoxyethanol and 5 parts of sodium lignin sulfonate.

The compounds were evaluated as fungicides in a standard slide spore germination test (cf. Phytopathology 33, 627 (1943)) utilizing spores of *Alternaria solani* (Alt.), *Monil.nia fructicola* (Mon.) and *Stemphylium sarcinaeforme* (Stem.). The values obtained for the concentration in parts per million (p.p.m.), which effectively control 50% of the spores ($ED_{50}$), are given in Table I for typical compounds.

TABLE I.—FUNGICIDAL DATA

| Compound | $ED_{50}$ (p.p.m.) | | |
|---|---|---|---|
| | Alt. | Mon. | Stem. |
| 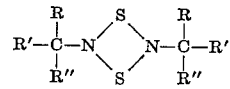 | 10–50 | 10–50 | 10–50 |
| 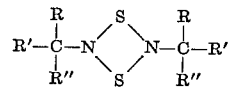 | 50–200 | 50–200 | 50–200 |

The compounds of this invention are found to be effective as corrosion inhibitors in lubricating oil compositions.

This invention provides a new class of 1,3,2,4-dithiadiazetidines which are useful in the preparation of other chemicals and which in themselves are useful as fungicides and corrosion inhibitors.

I claim:

1. A 2,4-di-t-alkyl-1,3,2,4-dithiadiazetidine of the formula

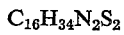

wherein R, R' and R'' represent alkyl groups.

2. A 2,4-di-t-alkyl-1,3,2,4-dithiadiazetidine of the formula

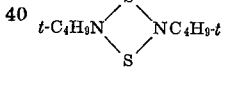

wherein R, R' and R'' represent alkyl groups and wherein the total number of carbon atoms in any one

group is less than 25.

3. A 2,4-di-t-alkyl-1,3,2,4-dithiadiazetidine in accordance with the formula of claim 1, wherein R and R' are methyl groups.
 4. 2,4-di-t-butyl-1,3,2,4-dithiadiazetidine.
 5. 2,4-di-t-octyl-1,3,2,4-dithiadiazetidine.
 6. 2,4-di-t-nonyl-1,3,2,4-dithiadiazetidine.
 7. 2,4-di-t-dodecyl-1,3,2,4-dithiadiazetidine.
 8. 2,4-di-t-tetradecyl-1,3,2,4-dithiadiazetidine.

References Cited

Stone et al.: J.A.C.S., vol. 81, pp. 3580–3584 (1959).

CHARLES B. PARKER, *Primary Examiner.*

N. WICZER, P. C. IVES, *Assistant Examiner.*